United States Patent
Dittrich et al.

(10) Patent No.: US 8,069,742 B2
(45) Date of Patent: Dec. 6, 2011

(54) MULTI-GROUP TRANSMISSION OF A MOTOR VEHICLE

(75) Inventors: Alan Dittrich, Constance (DE); Rayk Hoffmann, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 465 days.

(21) Appl. No.: 12/435,567

(22) Filed: May 5, 2009

(65) Prior Publication Data

US 2009/0280955 A1    Nov. 12, 2009

(30) Foreign Application Priority Data

May 8, 2008   (DE) .......................... 10 2008 001 646

(51) Int. Cl.
*F16H 3/08*     (2006.01)
*F16H 37/02*    (2006.01)

(52) U.S. Cl. .............................. 74/330; 475/209; 74/331
(58) Field of Classification Search .................... 74/330, 74/331

See application file for complete search history.

(56) References Cited

U.S. PATENT DOCUMENTS

| | | | | |
|---|---|---|---|---|
| 2,058,802 A * | 10/1936 | Kamper | ........................... | 74/337 |
| 3,175,411 A * | 3/1965  | McFarland | ...................... | 74/330 |
| 3,389,614 A * | 6/1968  | Shiber et al. | .................. | 74/330 |
| 3,906,817 A   | 9/1975  | Kreitzberg | | |
| 4,610,177 A * | 9/1986  | Mahoney | ........................ | 74/330 |
| 5,435,201 A   | 7/1995  | Preston et al. | | |
| 6,095,001 A   | 8/2000  | Ruehle et al. | | |
| 7,976,431 B2* | 7/2011  | Bader et al. | .................... | 477/109 |
| 2003/0176257 A1 | 9/2003 | Matsumura et al. | | |
| 2003/0209400 A1 | 11/2003 | Organek et al. | | |
| 2009/0107289 A1 | 4/2009 | Borntrager | | |
| 2009/0264241 A1* | 10/2009 | Dittrich et al. | ................ | 475/209 |

FOREIGN PATENT DOCUMENTS

| | | |
|---|---|---|
| DE | 3626179 | 2/1988 |
| DE | 102005046899 | 5/2007 |
| DE | 10 2006 024 370 A1 | 12/2007 |
| DE | 102006024370 | 12/2007 |
| EP | 0 933 558 A1 | 8/1999 |
| EP | 1344965 | 9/2003 |
| GB | 191009604 | 4/1911 |
| JP | 58146723 | 9/1983 |
| WO | 2007031193 | 3/2007 |

* cited by examiner

*Primary Examiner* — Dirk Wright
(74) *Attorney, Agent, or Firm* — Davis & Bujold, P.L.L.C.

(57) ABSTRACT

A motor vehicle transmission having at least two transmission groups and a method for operation of the transmission in which a mechanism is provided for maintaining traction force during gearshifts. A first friction clutch is an intermediate-gear clutch connected to a driveshaft of the motor and to a main transmission shaft which is connected with a transmission output shaft, the second friction clutch is a change-under-load clutch connected to the driveshaft and to a loose wheel of a second gear constant of a splitter group, and the third friction clutch is a change-under-load clutch connected with the driveshaft and with a loose wheel of a first gear constant of the splitter group. A direct connection can be formed in the transmission between the driveshaft and the main transmission shaft by way of the intermediate-gear clutch and the gear constants of the splitter group can be shifted, under load, by the change-under-load clutches.

10 Claims, 3 Drawing Sheets

Fig. 2

|    | 1 | 2  | 3  | 4  | 5  | 6  | 7  | 8  | 9  | 10 | 11 | 12 |
|----|---|----|----|----|----|----|----|----|----|----|----|----|
| 1  | X | LS | ZG | ZG | ZG | ZG |    |    |    |    |    |    |
| 2  | LS | X | ZG | ZG | ZG | ZG |    |    |    |    |    |    |
| 3  | ZG | ZG | X | LS | ZG | ZG |    |    |    |    |    |    |
| 4  | ZG | ZG | LS | X | ZG | ZG |    |    |    |    |    |    |
| 5  | ZG | ZG | ZG | ZG | X | LS |    |    |    |    |    |    |
| 6  | ZG | ZG | ZG | ZG | LS | X |    |    |    |    |    |    |
| 7  |    |    |    |    |    |    | X | LS | ZG | ZG | ZG | ZG |
| 8  |    |    |    |    |    |    | LS | X | ZG | ZG | ZG | ZG |
| 9  |    |    |    |    |    |    | ZG | ZG | X | LS | ZG | ZG |
| 10 |    |    |    |    |    |    | ZG | ZG | LS | X | ZG | ZG |
| 11 |    |    |    |    |    |    | ZG | ZG | ZG | ZG | X | LS |
| 12 |    |    |    |    |    |    | ZG | ZG | ZG | ZG | LS | X |

MULTI-GROUP TRANSMISSION OF A MOTOR VEHICLE

This application claims priority from German patent application serial no. 10 2008 001 646.2 filed May 8, 2008.

FIELD OF THE INVENTION

The invention concerns a multi-group transmission of a motor vehicle and a method for operating a multi-group transmission of a motor vehicle.

BACKGROUND OF THE INVENTION

Multi-group transmissions consist of two or more transmission groups, usually arranged in series, by combining the groups a large number of gears can be produced. Increasingly, they are designed as automated gearshift transmissions consisting, for example of an input group, a main group and a downstream range group. Such transmissions are used particularly in utility vehicles since they provide an especially fine gradation of gears, for example 12 or 16 gears, and are highly efficient. For a smaller number of gears, configurations with only a main group and an input group or a main group and a range group are also possible. Furthermore, compared with manual gearshift transmissions they are characterized by a high degree of operating comfort and, compared with automatic transmissions, their production and operating costs are particularly economical.

By virtue of their structure conventional multi-group gearshift transmissions, like all manual or automated gearshift transmissions not shifted under load, undergo a traction force interruption during gearshifts since the force flow from the drive motor is always interrupted by disengaging a clutch to disengage the engaged gear without load, to synchronize the transmission and the drive motor in a neutral position to a connection speed, and then to engage the target gear. Since the vehicle is rolling during the traction force interruption, undesired speed increases or decreases can occur. In addition fuel consumption can increase. Whereas with passenger motor vehicles the traction force interruption, which affects the driving dynamics, is as a rule perceived only as annoying, for example during upshifts in a driving style of sporty orientation, in the case of heavy utility vehicles the driving speed can be reduced to the point where an upshift is made impossible and, on uphill stretches, undesired downshifts, creep-driving or even additional starting operations may be necessary.

From DE 10 2006 024 370 A1 by the present applicant a traction-force-supported automated multi-group transmission with a splitter group as its input or upstream transmission, a main group as its main transmission and a range group as its output or downstream transmission is known. The structure of this known multi-group transmission with its input transmission and the main transmission enables a direct gear to be engaged as an intermediate gear during a gear change. For this, a direct connection is temporarily formed between an input shaft of the input transmission and a main shaft of the main transmission by means of a change-under-load clutch. This renders the main transmission and the splitter group free from load, so that the engaged gear can be disengaged, the transmission synchronized and the target gear engaged. During this the change-under-load clutch transmits the motor torque to the transmission output, and a dynamic torque that is released during a speed reduction between the original and target gears is used to compensate the traction force interruption to a large extent. The change-under-load clutch can be positioned between the input transmission and the main transmission or between an ordinary starting clutch and the input clutch. The gear ratio of the intermediate gear is determined by the direct connection of the input shaft to the main shaft. Although the starting clutch can remain engaged during the gearshift operation, it is present as a separate starting element.

Furthermore, from EP 0 933 558 A1 a variable-speed transmission of a motor vehicle having a countershaft structure is known, in which one of the gears, preferably a $2^{nd}$ gear, is arranged on an auxiliary shaft. To reduce the jerk caused by the traction force interruption during a gearshift operation, in addition to a conventional starting or separator clutch, a friction clutch is arranged on the transmission input, which acts upon this gear via the auxiliary shaft. The two clutches can for example be made as a double clutch, such that a transmission input shaft connected to the starting clutch is surrounded coaxially by a hollow shaft connected to the friction clutch. When actuated the friction clutch, via a drive input gearset, transmits motor torque to the auxiliary shaft, on which a gearwheel of the gear is mounted, which is engaged with a gearwheel on a transmission output shaft.

During a gearshift from an engaged gear to the auxiliary shaft gear, i.e. for example from the $1^{st}$ to the $2^{nd}$ gear, the friction clutch is engaged, i.e. the auxiliary gear is engaged. As a result of the speeds produced, the torque flow via the separator clutch is reduced so that the torque path of the gear engaged becomes load-free and the $1^{st}$ gear can be disengaged. If now the transmission is in the auxiliary-shaft gear, then in the next gearshift, i.e. for example from the $2^{nd}$ to the $3^{rd}$ gear, the target gear is engaged while the separator clutch is disengaged and the separator clutch is then engaged, so that now the torque path of the auxiliary-shaft gear becomes load-free and the friction clutch can be disengaged again. All gearshifts in which the auxiliary-shaft gear is the original or the target gear can therefore be carried out under load and thus without traction force interruption. Furthermore, in gearshifts between gears that are directly adjacent to the auxiliary-shaft gear, the shift jerk can be reduced by operating the friction clutch in a slipping mode. For other gearshifts a traction force interruption still takes place in the conventional manner.

The transmission described in EP 0 933 558 A1 serves the purpose of improving the shifting comfort, in the lower gears which are particularly prone to jerky shifting, with the least possible cost and effort. In that respect it can fulfil its set objective completely. However, the traction force support is limited to certain gearshifts. But in the case of a multi-group transmission with a fine gradation and a large number of gears, traction force interruptions in all the traction upshifts and traction downshifts, i.e. in the higher gears as well, can have a disturbing effect. Besides, an additional auxiliary shaft and its drive input gearset demand a corresponding amount of structural space, which in group transmissions usually comprising two countershafts, is not always available or can only be made so with difficulty.

SUMMARY OF THE INVENTION

Against this background the purpose of the present invention is to indicate a multi-group transmission and a method for operating a multi-group transmission which, with means as simple, inexpensive and space-saving as possible, enable traction force interruptions to be eliminated as much as possible during traction upshifts and traction downshifts, while also ensuring a high level of shifting comfort.

The invention is based on the recognition that in a group change-speed transmission, with comparatively little construction effort and cost, friction clutches can be connected upstream, by means of which a geared change-speed input group can be shifted under load and the shift processes of a geared change-speed main group can be traction-force-supported by engaging an intermediate gear, so as to provide an inexpensive automated transmission whose shifting behavior is similarly comfortable to that of an automatic transmission but which has the properties of high transmission efficiency and a fine gear gradation that are particularly important for utility vehicles.

Accordingly, the invention starts from a multi-group transmission of a motor vehicle, with at least two transmission groups arranged in a drivetrain, in which means for supporting the traction force during gearshift operations are provided. To achieve the stated objective the invention also provides that between a drive motor and a transmission input, a clutch mechanism with three friction clutches is provided, the first friction clutch being made as an intermediate-gear clutch connected on its input side to a driveshaft of the drive motor and on its output side to a main transmission shaft which is at least actively connected to a transmission output shaft, the second friction clutch being made as a change-under-load clutch connected on its input side with the driveshaft of the drive motor and on its output side with a loose wheel of a second constant of an upstream group made as a geared transmission, and the third friction clutch being made as a change-under-load clutch connected on its input side with the driveshaft of the drive motor and on its output side with a loose wheel of a first constant of the upstream group, so that by means of the intermediate-gear clutch a direct connection can be formed between the driveshaft of the drive motor and the main transmission shaft and by means of the change-under-load clutches, the constants of the upstream group can be changed under load.

A gearshift is understood to mean a shift operation in which an original gear is disengaged and a target gear is engaged, including also the special case in which the target gear is the same as the original gear so that no gear ratio change takes place. An upstream group is also denoted as a splitter transmission or splitter group (GV), a main group also as a main transmission or basic transmission (HG) and a downstream group also as a range transmission or range group (GP).

The invention also starts from a method for operating a multi-group transmission of a motor vehicle, with at least two transmission groups arranged in a drivetrain, in which traction-force-supporting means are activated during a gearshift operation. The stated objective in relation to method is achieved in that necessary shift operations between the constants in a splitter group are carried out by a change-under-load in which change-under-load clutches arranged between a drive motor and a transmission input, which act upon the constants, are operated in a slipping mode and in the case of other traction-force-relevant shift operations an intermediate-gear engagement takes place, in which an intermediate-gear clutch, also arranged between the drive motor and the transmission input is operated in slipping mode and in such manner that by means of the intermediate-gear clutch, a direct force-flow connection is made between the drive motor and a main transmission shaft which is at least actively connected to a transmission output shaft.

In a preferred embodiment the multi-group transmission with its traction-force-maintaining means according to the invention, designed as change-under-load clutches and the intermediate-gear clutch, comprises three transmission groups arranged one after another in the force flow, such that a splitter group and a main group are advantageously made as geared transmissions of countershaft structure with at least one common countershaft and a downstream range group is made as a planetary transmission. Preferably, such a transmission is designed with two countershafts so that the power correspondingly branches via the two countershafts. However, the invention can also be applied with advantage in countershaft transmissions with only one countershaft, or in other group transmissions. Indeed, the downstream range group mentioned is only present for the sake of example, in order to make available a comparatively large number of gears, but is not strictly necessary.

By virtue of the constants of the splitter transmission the gear steps of the main group can be varied. The gears so obtained are then multiplied by the range group optionally with a planetary gear ratio. Thus for example, with a three-gear basic transmission the number of forward gears obtained is $n = n_{GV} \times n_{HG} \times n_{GP} = 2 \times 3 \times 2 = 12$, or with a four-gear basic transmission 16 forward gears. Owing to its fine gear gradation and its high shifting comfort such a transmission can be used particularly advantageously in utility vehicles.

According to the invention, three friction clutches are located on the drive input side which respectively control the constants of the splitter group and the intermediate gear. The gearshifts between the constants are carried out directly under load by slipping operation of two associated friction clutches. All other gearshift operations are traction-force-supported by the intermediate gear using a further friction clutch.

To achieve a particularly compact structure it can be provided that the three friction clutches have a common, outer disk carrier connected on the motor side to the driveshaft which act as input for the clutch, and in each case a respective, radially inner disk carrier clutch output component. Advantageously, in this case the three friction clutches are arranged coaxially with one another and the main transmission shaft connected to the clutch output component of the intermediate-gear clutch is arranged as an inner shaft enclosed by a middle, hollow shaft connected to the clutch output component of the second friction clutch, the middle shaft in turn being enclosed by an outer hollow shaft connected to the clutch output component of the third friction clutch, such that the middle hollow shaft is connected to the loose wheel of the second constant of the splitter group, the one remote from the motor, and the outer hollow shaft is connected to the loose wheel of the first constant of the splitter group, the one nearest the motor. The friction clutches can be made as dry- or wet-operating, single- or multi-disk clutches with the corresponding, co-operating friction partners on the clutch input and clutch output components.

By means of the intermediate-gear clutch an intermediate gear, made as a direct gear, i.e. a direct connection between the driveshaft and the main transmission shaft or the transmission output shaft, can be engaged. When this intermediate gear is engaged the main transmission is free from load and can therefore be shifted. During this the intermediate-gear clutch, operating in a slipping condition, transmits the motor torque to the drive output during a traction upshift or traction downshift, while the motor speed is adapted to the speed of the target gear. The torque released by the motor speed adaptation is thus used for maintaining the traction force. Expediently, during the engagement of the intermediate gear the respective change-under-load clutch engaged in the original gear at the time, remains engaged to establish the speed of the target gear. When the synchronous speed has been reached the target gear is engaged and the intermediate gear is disengaged again. In principle, such gearshifts with traction force support can also be carried out over gear intervals of two or more steps.

In designing the intermediate gear as a direct gear, the function of a downstream range group of a planetary structure, if present, must also be taken into account when the main transmission shaft co-operates with the transmission output shaft via such a downstream transmission. In a shift position in which the planetary gears of the range group are locked together with the sun gear and the ring gear so that the range group rotates at the same speed as the main transmission shaft, the intermediate gear is the direct gear of the transmission as a whole. This is automatically also the case when, as can be provided in another embodiment of the invention, the main transmission shaft is connected directly to the transmission output shaft at the transmission outlet, so that the main shaft passes through the range group. Otherwise, however, the intermediate gear constitutes a direct gear of the geared transmission groups on which is superposed the gear ratio of the planetary gear system.

In this context it should also be noted that a shift in the range group during a gearshift operation is not traction-force-supported in its own right. However, the traction force support can advantageously be extended to the range change if change-under-load means are arranged in advance on the range transmission to make possible a range change under load. This too is a constituent of the present invention.

If no downstream range group is provided, then the main transmission shaft functions at the same time as the transmission output shaft of the transmission as a whole, or it can be connected integrally to a transmission output shaft.

Advantageously, by virtue of the intermediate gear engagement a significant reduction of speed loss is obtained in all traction gearshifts and thus, the resulting driving performance is improved along with greater shift and driving comfort. Since the rotating masses to be synchronized can be braked by the intermediate gear, the transmission brake usually provided for braking those masses in upshift processes can be omitted, whereby further costs, fitting space and weight are saved or reduced. In addition oscillations and jerky shifts are effectively reduced because during the gearshift process the drivetrain remains under load at all times due to the intermediate gear, and this additionally increases the shifting comfort.

With the upstream change-under-load clutches, which act upon the gearsets of the splitter group by virtue of an active connection of the respective loose wheel to the driveshaft, the splitter group can be changed under load. The change-under-load clutches replace the shift and synchronization elements usually provided in the splitter group along with a separate starting element, and this further reduces the costs, structural space and weight. Shift operations only involving the constants of the splitter group, i.e. in particular ones in which no shift processes take place in the basic transmission, can therefore be changed under load directly by slipping operation of the two change-under-load clutches in a particularly short shift time. As already explained, all other gearshifts are traction-force-supported by means of the intermediate gear.

BRIEF DESCRIPTION OF THE DRAWINGS

To clarify the invention the description of a drawing with an example embodiment is attached. The drawing shows:

FIG. 2: Shift table of the transmission layout, with changes under load and intermediate-gear engagements,

DETAILED DESCRIPTION OF THE PREFERRED EMBODIMENTS

Figure 1:
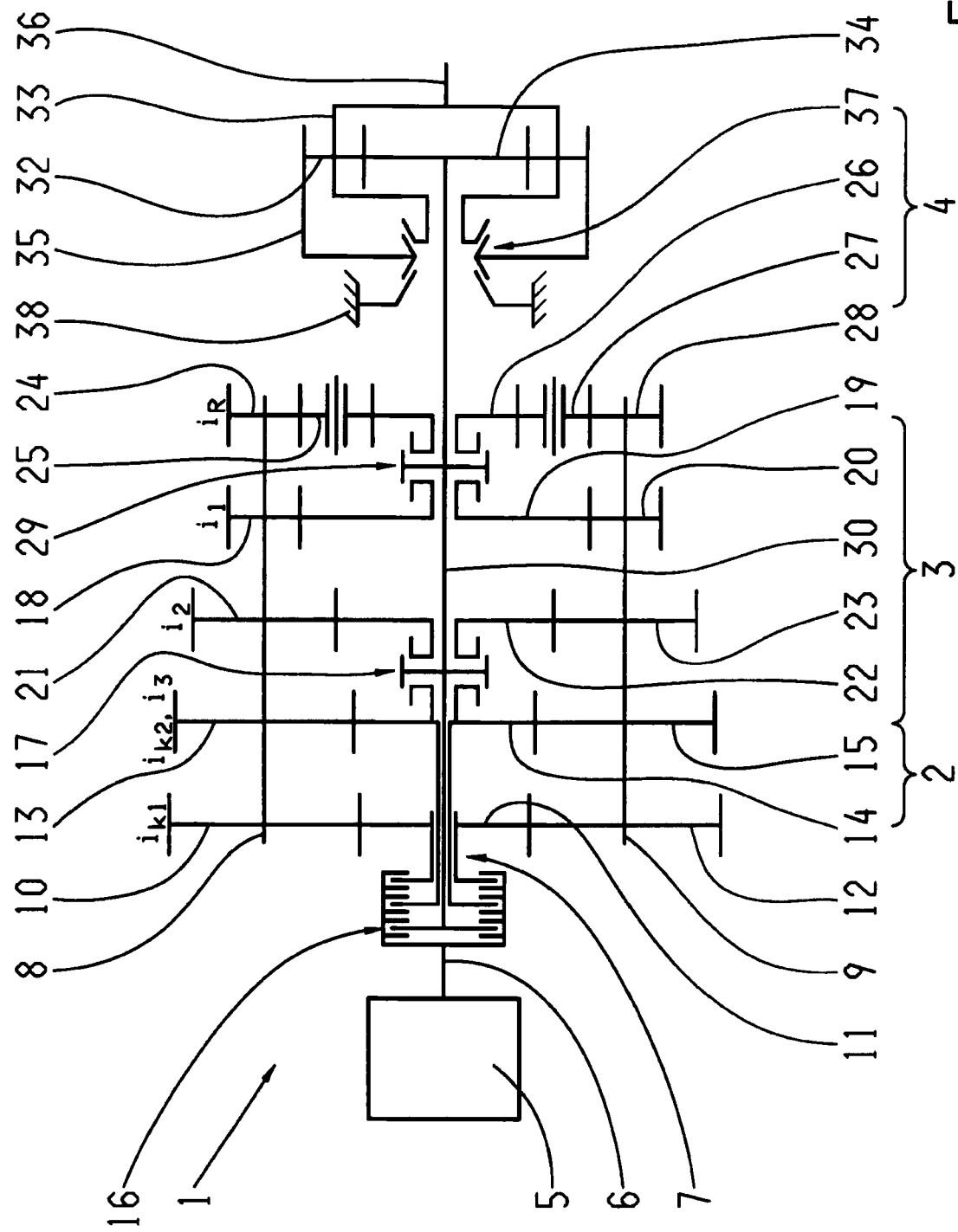
FIG. 1: Transmission layout of an automated multi-group transmission of a motor vehicle, with a clutch mechanism comprising three clutches arranged on the drive input side.

FIG. 1 shows an automated multi-group transmission made as a two-countershaft transmission 1 with two parallel rotatably mounted countershafts 8, 9 and three transmission groups 2, 3 and 4 arranged one after another, as can be provided for example in the drivetrain of a truck. Such a transmission per se, i.e. without traction force support, is known in particular from the ZF-AS Tronic series, and with a traction-force-supporting direct gear engagement, but with a splitter group that cannot be changed under load, from DE 10 2006 024 370 A1 by the present applicant, mentioned at the beginning.

The first transmission group 2, arranged on the motor side, is a two-gear splitter transmission. The second, central transmission group 3 is a three-gear main or basic transmission. As the final transmission group 4 on the drive output side, a downstream, two-gear range transmission is provided.

The splitter group 2 has two gear constants $i_{k1}$, $i_{k2}$, each comprising a fixed wheel 10, 12 and 13, 15 respectively, arranged in a rotationally fixed manner on the first countershaft 8 and the second countershaft 9, which mesh with respective a loose wheel 11 or 14. The first gear constant $i_{k1}$ is arranged facing a drive motor 5 and the second gear constant $i_{k2}$ facing the main transmission 3.

The main transmission 3 has three forward-gear gearsets $i_1$, $i_2$ and $i_3$ and a reverse gear gearset $i_R$. The 1st main transmission gear $i_1$ and the $2^{nd}$ main transmission gear $i_2$ each have two fixed wheels 18, 20 or 21, 23 and one loose wheel 19 or 22. The $3^{rd}$ main transmission gear $i_3$ is the same as the second constant $i_{k2}$ of the splitter group 2. The reverse-gear gearset $i_R$ comprises two fixed wheels 24 and 28, a loose wheel 26 and two freely rotating intermediate gearwheels 25, 27 to reverse the direction of rotation, which mesh on one side with the respective associated fixed wheel 24 or 28 and on the other side with the loose wheel 26.

To engage the $1^{st}$ main transmission gear $i_1$ and the reverse-gear gearset $i_R$, an unsynchronized claw-type shift device 29 is provided, by means of which the associated loose wheels can optionally be connected in a rotationally fixed manner to a central main transmission shaft 30. The $2^{nd}$ main transmission gear $i_2$ and the $3^{rd}$ main transmission gear $i_3$ are engaged by means of another claw-type shift device 17, by which the associated loose wheels 22 or 14 can be connected in a rotationally fixed manner to the main transmission shaft 30.

The downstream range group 4 is a planetary transmission. In it, a planetary gearset 32 with a plurality of not explicitly illustrated planetary gears is supported by a planetary gear carrier 33. The planetary gears mesh on one side with a central sun gear 34 and on the other side with an outer ring gear 35. The sun gear 34 is connected to the main transmission shaft 30. In turn, the planetary gear carrier 33 is connected to a transmission output shaft 36. To shift the range group 4 a shift device 37, advantageously with synchronization, is provided. In a first shift position this shift device 37 connects the ring gear 35 to a housing 38 so that the planetary gears rotate between the ring gear 35 and the sun gear 34 and the transmission output shaft 36 is driven by the planetary carrier 33, in accordance with the gear ratio, in the same direction as the main transmission shaft 30. In a second shift position the ring gear 35 is locked to the planetary gear carrier 33, so that the planetary transmission 4 and hence the transmission output shaft 36 rotate at the speed of the main transmission shaft 30.

Figure 1A:
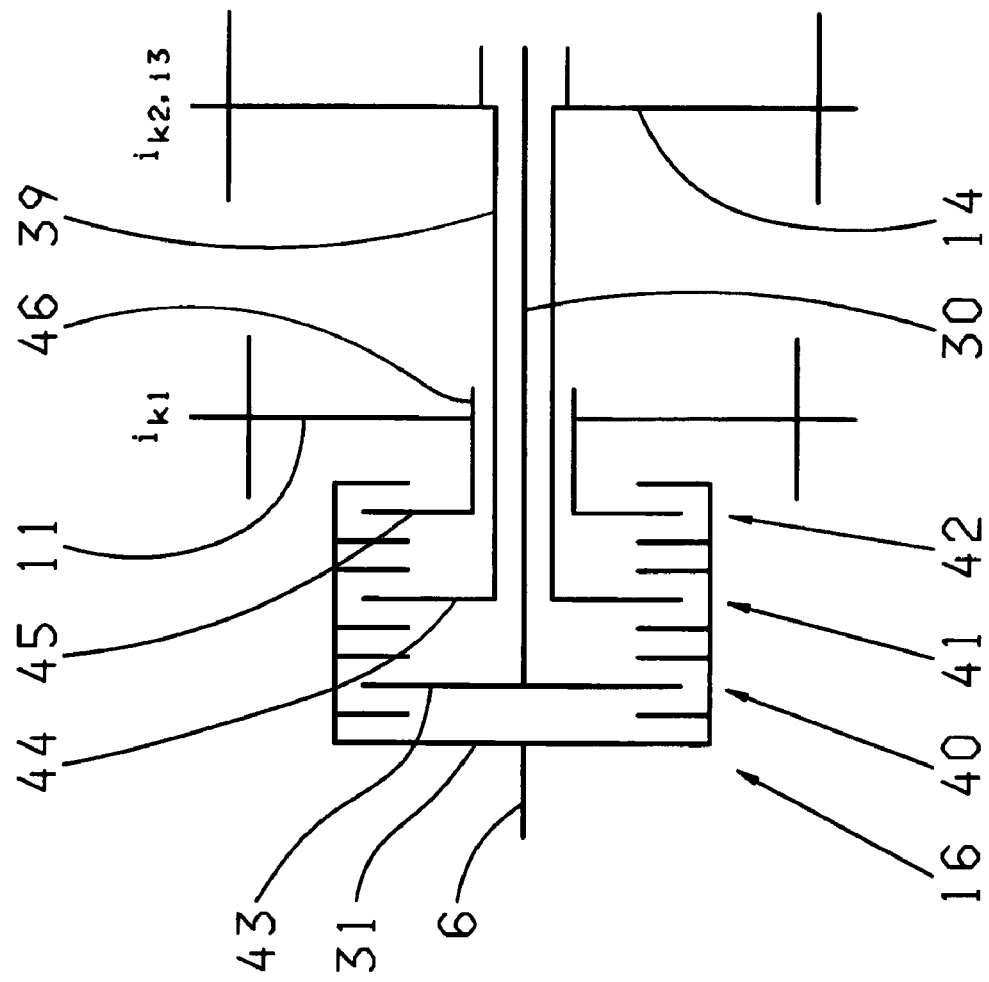
FIG. 1a: Enlarged section of FIG. 1 showing the clutch mechanism.

Arranged between the drive motor 5 and a transmission input 7, according to the invention, is a clutch mechanism 16 with three friction clutches 40, 41, 42. As can be seen clearly in FIG. 1a, the three friction clutches 40, 41, 42 have a common outer clutch input component 31 which is connected to the driveshaft 6 of the drive motor 5, and in each case a respective inner, clutch output component 43, 44, 45. The first friction clutch 40, nearest the motor, is designed as an intermediate-gear clutch whose output component 43 is connected to the main transmission shaft 30. The second, middle friction clutch 41 is a change-under-load clutch whose output component 44 is connected, via a middle hollow shaft 39 that encloses the main transmission shaft 30 coaxially, to the loose wheel 14 of the second gear constant $i_{k2}$ of the splitter group 2. The third friction clutch 42, remote from the motor, is also a change-under-load clutch whose output component 45 is connected, via an outer hollow shaft 46 that encloses the middle hollow shaft 39, to the loose wheel 11 of the first gear constant $i_{k1}$ of the splitter group 2. By means of the two change-under-load clutches 41, 42, the loose wheels 11, 14 of the two gear constants $i_{k1}$, $i_{k2}$ can be frictionally connected to the driveshaft 6. By means of the intermediate-gear clutch 40, the main transmission shaft 30 can be frictionally connected to the driveshaft 6.

To control the clutch mechanism 16, a clutch control device (not shown) is provided, which communicates in appropriate ways with transmission control and motor control units (also not shown). By actuating the change-under-load clutches 41, 42 in a slipping mode the gear constants $i_{k1}$, $i_{k2}$ can be selectively shifted to engage the drive motor 5 with no interruption of the force flow. Thus, the splitter group 2 can be changed under load. The change-under-load clutches 41, 42 can in addition each be operated as a starting element. The intermediate-gear clutch 40 serves to produce a direct connection between the drive input and the drive output, which can be engaged in slipping operation as an intermediate gear.

From the combination of the transmission groups 2, 3 and 4 of the transmission layout shown, a total of n=2×3×2=12 gears are obtained. The force flow of the transmission 1 branches in accordance with a shift sequence in which, beginning with the $1^{st}$ gear in the main transmission 3, the splitter group 2 and the main group 3 are shifted through in alternation so that, in sequence, 2×3×6 gears of a lower gear range "$1^{st}$ gear to $6^{th}$ gear" are engaged. After the $6^{th}$ gear has been reached, the range group 4 is shifted over and the main group 3 and splitter group 2 are again alternatingly shifted through to again engage 2×3=6 gears, but this time in an upper gear range of "7th gear to $12^{th}$ gear". In addition the splitter group 2 also shifts the reverse gear ratio $i_R$ in alternation, so that two reverse gears are provided.

FIG. 2 illustrates the shift pattern of the transmission 1. The table distinguishes between gearshifts carried out by shifting between the gear constants $i_{k1}$, $i_{k2}$ with the change-under-load clutches 41, 42 as direct shifts under load LS, and gearshifts involving shift processes between the gears $i_1$, $i_2$, $i_3$ of the main transmission, in which an intermediate gear ZG is engaged to maintain the traction force during the gear change by means of the intermediate-gear clutch 40. From the table it is clear that in the case of a sequential shift series, i.e. for example from the $3^{rd}$ to the $4^{th}$ and from the $4^{th}$ to the $5^{th}$ gear, within both gear ranges changes under load and intermediate-gear engagements alternate. For larger gear intervals successive intermediate-gear shifts can also take place.

A method according to the invention for operating a multi-group transmission of a motor vehicle is based essentially on the fact that during a gearshift, depending on the shift operation and the transmission involved, a change-under-load or an intermediate-gear engagement takes place in order to maintain the traction force of the vehicle.

Those gearshifts, in which the gear constants $i_{k1}$, $i_{k2}$ are shifted between, i.e. according to the shift table of FIG. 2 the gearshifts "$1^{st}$ to $2^{nd}$ gear", "$3^{rd}$ to $4^{th}$ gear", "$5^{th}$ to $6^{th}$ gear", "$7^{th}$ to $8^{th}$ gear", "$9^{th}$ to $10^{th}$ gear" and "$11^{th}$ to $12^{th}$ gear", are directly changed under load by virtue of the slipping change-under-load clutches 41, 42. The remaining gearshift between them, "$6^{th}$ to $7^{th}$ gear", takes place by shifting the range of the range group 4.

During a gearshift with a shift operation in the main group 3 of the transmission 1, i.e. according to the shift table the gearshifts "$2^{nd}$ to $3^{rd}$ gear", "$4^{th}$ to $5^{th}$ gear", "$8^{th}$ to $9^{th}$ gear" and "$10^{th}$ to $11^{th}$ gear", the direct gear, i.e. the $12^{th}$ gear is engaged as the intermediate gear. For this the intermediate-gear clutch 40 is actuated the engage so that the motor torque is transmitted to the main transmission shaft 30 or directly to the transmission output shaft 36. The main transmission 3 then becomes load-free and can be shifted.

In an upshift between a gear originally engaged and a target, gear the motor speed is reduced during this torque transmission by the slipping intermediate-gear clutch 40, to the synchronous speed of the target gear. The respectively engaged change-under-load clutches 41, 42 which are engaged in the original gear that is engaged at the time, remain engaged during the engagement of the intermediate gear. When the speed has been equalized between the main transmission shaft 30 and the loose wheel 11, 14, 19, 22 to be engaged, the target gear can be engaged and the intermediate-gear clutch 40 can then be fully disengaged again, to complete the gearshift operation.

LIST OF INDEXES

1 Two-countershaft transmission
2 Upstream group, splitter transmission
3 Main group, main transmission
4 Downstream group, range transmission
5 Drive motor
6 Driveshaft
7 Transmission input
8 Countershaft
9 Countershaft
10 Fixed wheel
11 Loose wheel
12 Fixed wheel
13 Fixed wheel
14 Loose wheel
15 Fixed wheel
16 Clutch device
17 Shifting device
18 Fixed wheel
19 Loose wheel
20 Fixed wheel
21 Fixed wheel
22 Loose wheel
23 Fixed wheel
24 Fixed wheel
25 Intermediate wheel
26 Loose wheel
27 Intermediate wheel
28 Fixed wheel
29 Shifting device
30 Main transmission shaft
31 Clutch input component
32 Planetary gearset
33 Planetary gear carrier
34 Sun gear
35 Ring gear 36 Transmission output shaft
37 Shifting device
38 Housing
39 Hollow shaft
40 Friction clutch, intermediate-gear clutch
41 Friction clutch, change-under-load clutch
42 Friction clutch, change-under-load clutch
43 Clutch output component
44 Clutch output component
45 Clutch output component
46 Hollow shaft
$i_{k1}$ Splitter group gear constant
$i_{k2}$ Splitter group gear constant
$i_1$ Main group gear
$i_2$ Main group gear
$i_3$ Main group gear
$i_R$ Main group reverse gear
LS Change under load
ZG Intermediate gear engagement

The invention claimed is:

1. A multi-group transmission of a motor vehicle comprising at least two transmission groups (2, 3) arranged in a drivetrain having a means for supporting traction force during gearshifts, a clutch mechanism (16) comprising first, second and third friction clutches (40, 41, 42) arranged between a drive motor (5) and a transmission input (7), the first friction clutch (40) being an intermediate-gear clutch and having an input side connected to a driveshaft (6) of the drive motor (5) and an output side connected to a main transmission shaft (30) which is at least actively connected with a transmission output shaft (36), the second friction clutch (41) being a change-under-load clutch and having an input side connected to the driveshaft (6) of the drive motor (5) and an output side connected to a loose wheel (14) of a second gear constant ($i_{k2}$) of a splitter transmission group (2), the third friction clutch (42) being a change-under-load clutch and having an input side connected with the driveshaft (6) of the drive motor (5) and an output side connected with a loose wheel (11) of a first gear constant ($i_{k1}$) of the splitter transmission group (2), and the driveshaft (6) of the drive motor (5) being directly connectable, via the first friction clutch (40), to the main transmission shaft (30) and the first and the second gear constants ($i_{k1}$, $i_{k2}$) of the splitter transmission group (2) being shiftable under load by the second and the third friction clutches (41, 42).

2. The multi-group transmission according to claim 1, wherein the first, the second and the third friction clutches (40, 41, 42) have a common outer clutch input component (31) that is connected to the driveshaft (6) of the drive motor (5) and the first, the second and the third friction clutches (40, 41, 42) each respectively has a distinct inner clutch output component (43, 44, 45).

3. The multi-group transmission according to claim 1, wherein the first, the second and the third friction clutches (40, 41, 42) are coaxial with one another, and the main transmission shaft (30) is connected to a clutch output component (43) of the first friction clutch (40) and arranged as an inner shaft within a middle, hollow shaft (39) which is connected to a clutch output component (44) of the second friction clutch (41), the middle hollow shaft (39) is arranged within an outer hollow shaft (46) and is connected to a clutch output component (45) of the third friction clutch (42), the middle hollow shaft (39) is connected to the loose wheel (14) of the second gear constant ($i_{k2}$) of the splitter transmission group (2), axially remote from the motor, and the outer hollow shaft (46) is connected to the loose wheel (11) of the first gear constant ($i_{k1}$) of the splitter transmission group (2), axially closer to the motor (5) than the loose wheel (14) of the second gear constant ($i_{k2}$) of the splitter transmission group (2).

4. The multi-group transmission according to claim 1, wherein the multi-group transmission has three automated transmission groups (2, 3, 4) with the splitter transmission group (2) located on input side the multi-group transmission and having the first and the second gear constants ($i_{k1}$, $i_{k2}$), a central main transmission group (3) having at least three gear sets ($i_1$, $i_2$, $i_3$), and a range transmission group (4) having two gear ranges, the splitter transmission group (2), the main transmission group (3) and the range transmission group (4) are sequentially arranged one after another in a force flow, the splitter transmission group (2) and the main transmission group (3) each have a countershaft design with at least one common countershaft (8, 9), and the range transmission group (4) is a planetary transmission.

5. The multi-group transmission according to claim 1, wherein a main transmission shaft (30) is actively connected to the transmission output shaft (36) via a range transmission group (4).

6. The multi-group transmission according to claim 5, wherein the range transmission group (4) is shiftable under load.

7. The multi-group transmission according to claim 5, wherein the main transmission shaft (30) is directly connected to the transmission output shaft (36).

8. A method of operating a multi-group transmission of a motor vehicle, having at least two transmission groups (2, 3) arranged in a drivetrain, in which traction-force-supporting means are activated during a gearshift operation, the method comprising the steps of:

shifting between gear constants ($i_{k1}$, $i_{k2}$) within a splitter transmission group (2) by a change under load in which change-under-load clutches (41, 42) operate in a slipping mode on the gear constants ($i_{k1}$, $i_{k2}$), the change-under-load clutches (41, 42) being arranged between a drive motor (5) and a transmission input (7);

operating an intermediate-gear clutch (40), which is arranged between the drive motor (5) and the transmission input (7), in a slipping mode during an intermediate gearshift for other traction-force-relevant shift operations such that a direct force-flow connection is formed between the drive motor (5) and a main transmission shaft (30) which is at least actively connected to a transmission output shaft (36).

9. The method according to claim 8, further comprising the steps of:

transmitting the motor torque of the drive motor (5), during an intermediate gear engagement during a gearshift operation, via the intermediate-gear clutch (40), in slipping operation, to the main transmission shaft (30) on a drive output side while adapting a speed of the drive motor (5) to a synchronous speed of a target gear, disengaging an original gear without load, engaging the target gear when the synchronous speed has been reached, and disengaging the intermediate gear.

10. The method according to claim 9, further comprising the step of maintaining engagement of the respective change-under-load clutch (41, 42), which is engaged while the original gear is engaged, during engagement of the intermediate gear.

* * * * *